(12) United States Patent
Nicotina

(10) Patent No.: US 6,508,283 B1
(45) Date of Patent: *Jan. 21, 2003

(54) TRYE HAVING A TREAD BAND

(75) Inventor: Domenico Nicotina, Cornaredo (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,738

(22) Filed: Apr. 28, 2000

Related U.S. Application Data

(63) Continuation of application No. 08/966,807, filed on Nov. 10, 1997, now Pat. No. 6,129,127.

(30) Foreign Application Priority Data

Nov. 12, 1996 (IT) .......................................... MI96A2332

(51) Int. Cl.$^7$ ....................... B60C 11/11; B60C 107/00; B60C 121/00

(52) U.S. Cl. ............................... 152/209.1; 152/209.18; 152/902; 152/903

(58) Field of Search ........................... 152/209.1, 209.2, 152/209.18, 209.28, 902, 903; D12/594, 574

(56) References Cited

U.S. PATENT DOCUMENTS

| | | |
|---|---|---|
| 3,674,077 A | 7/1972 | Verdier |
| 4,057,089 A | 11/1977 | Johannsen |
| 5,291,929 A | 3/1994 | Daisho et al. |
| 5,343,914 A | 9/1994 | Wako |
| 5,361,815 A | 11/1994 | Loser et al. |
| 5,435,366 A | 7/1995 | Voigt et al. |
| 5,454,411 A | 10/1995 | Weyrich et al. |
| 5,609,699 A | 3/1997 | Himuro |
| D388,058 S | 12/1997 | Hamamoto et al. |
| D388,752 S | 1/1998 | Tsutsumi et al. |
| 5,759,313 A | 6/1998 | Shirai et al. |
| 6,129,127 A * | 10/2000 | Nicotina ..................... 152/903 |

FOREIGN PATENT DOCUMENTS

| | | |
|---|---|---|
| EP | 0235830 | 9/1987 |
| EP | 0259243 | 3/1988 |
| EP | 0455925 | 11/1991 |
| EP | 0506279 | 9/1992 |
| EP | 0627332 | 12/1994 |
| JP | 4-043105 | 2/1992 |
| JP | 4-274907 | 9/1992 |
| JP | 6-040215 | 2/1994 |
| JP | 6-143935 | 5/1994 |
| JP | 6-305308 | 11/1994 |

OTHER PUBLICATIONS

H. Yasuo, "Pneumatic Radial Tire," Patent Abstracts of Japan, vol. 16, No. 223, Publication No. 04 043 105 (1992).
T. Kunio et al., "Pneumatic Tire," Patent Abstracts of Japan, vol. 16, No. 235, Publication No. 04 050 006 (1992).

* cited by examiner

Primary Examiner—Steven D. Maki
(74) Attorney, Agent, or Firm—Finnegan, Henderson, Farabow, Garrett & Dunner, L.L.P.

(57) ABSTRACT

A tyre includes a tread band having at least two substantially parallel longitudinal grooves and at least one series of transverse grooves crossing the longitudinal grooves. The transverse and longitudinal grooves delimit at least two rows of shoulder blocks and at least one row of centre blocks. The transverse grooves have at least two transverse channels, each including an outer end stretch in an orientation substantially perpendicular to an equatorial plane of the tyre and a curvilinear connecting stretch close to the equatorial plane. The joining of laterally-opposite transverse channels gives each transverse groove a continuous course. At least one transverse channel of at least one of the transverse grooves also includes an inner end stretch. The connecting stretch interconnects the outer end stretch with the inner end stretch in a continuity relationship. The inner end stretch penetrates a center block but does not cross any other of the transverse grooves such that the center block is a single element defined by the longitudinal grooves extending between two contiguous transverse grooves.

27 Claims, 1 Drawing Sheet

TRYE HAVING A TREAD BAND

CROSS-REFERENCE TO RELATED APPLICATIONS

This application is a continuation of U.S. patent application Ser. No. 08/966,807, filed Nov. 10, 1997, now U.S. Pat. No. 6,129,127 in the U.S. Patent and Trademark Office, the content of which is relied upon and incorporated herein by reference; additionally, Applicant claims the right of priority under 35 U.S.C. §119(a)–(d) based on patent application No. MI96 A 002332, filed Nov. 12, 1996, in the Italian Patent Office.

BACKGROUND OF THE INVENTION

1. Field of the Invention

The present invention relates to a tyre tread band, in particular for off-road motor-vehicles, of the type comprising at least two longitudinal grooves substantially parallel to each other and extending circumferentially on opposite sides of the equatorial plane of a tyre carrying said tread band; at least one series of transverse grooves crossing the longitudinal grooves, said transverse and longitudinal grooves delimiting at least two rows of shoulder blocks circumferentially distributed at opposite side edges, and at least one row of centre blocks disposed between said rows of shoulder blocks.

In more detail, the invention relates to a tread band having a pattern of a bidirectional and/or symmetric type.

The invention also pertains to a tyre, in particular for off-road motor-vehicles, provided with the tread band in reference.

2. Description of the Related Art

It is known that tread bands in tyres have a pattern suit-ably cut by a series of longitudinal and transverse grooves, adapted to normally define one or more rows of circumferentially distributed centre blocks alongside which, on respectively opposite sides, there are respective rows of shoulder blocks located close to the opposite side edges of the tread band.

The geometrical and size features of the grooves and of further possible cuts provided in the tread band, and consequently of the blocks defined thereby, are selected each time during the planning step, depending on the performance features required from the tyre, based on the intended type of use.

Usually, the longitudinal grooves perform the function of giving the tyre steering property and roadholding features in relation to transverse stresses, that is stresses directed parallelly to the rotation axis of the tyre. The transverse grooves in turn perform the function of giving the tyre good traction performance, in relation to the tangential thrusts directed parallelly to the running direction.

In addition, longitudinal and transverse grooves cooperate in carrying out an efficient water-draining action from the ground-contacting area of the tyre when the vehicle is running on a wet road surface.

After the above statements, in making tyres particularly adapted for use on off-road motor-vehicles, good traction performances are to be achieved above all with reference to muddy and snow-covered grounds or in any case grounds of low consistency. These requirements are presently met by providing a great number of grooves and longitudinal and transverse cuts of great width and depth.

However this solution has a tendency to impair the tyre running behaviour on normally asphalted roadways. Actually, due to the presence of many big grooves, the sizes and stiffness of the blocks is greatly reduced.

Consequently, the block can be unable to conveniently withstand stresses to which the tyre is submitted both when the vehicle is running on a straight stretch and during the cornering, thereby giving rise to a rather uncertain and imprecise behaviour on the road, as well as to early and/or uneven wear of the tread band. In addition, the presence of big transverse grooves has a tendency to give rise to an undesired increase in noise and in the rolling resistance force of the tyre and, as a matter of fact, the present market requirements attach an increasingly greater importance to these factors.

SUMMARY OF THE INVENTION

In accordance with the present invention, it has been found that an optimal running behaviour on an asphalted road can be given to a tyre while enabling the same to keep appropriate traction performances on muddy, snow-covered or in any case loose road surfaces, by arranging transverse grooves in the tread band consisting each of at least two channels of curved extension that, starting from respective side edges of the tread band mutually meet to form a continuous groove of undulated extension obliquely crossed by a cut made up of the inner end stretches of said channels and preferably slightly inclined to the circumferential extension direction, or more preferably substantially parallel thereto.

Still in accordance with the invention, the thread band of a tyre, in particular for off-road motor-vehicles, is characterized in that each of said transverse grooves is substantially defined by at least two transverse channels each of which has an outer end stretch extending from the respective side edge of the tread band according to an orientation substantially perpendicular to the equatorial plane; an inner end stretch preferably inclined to the equatorial plane; a curvilinear connecting stretch joining the outer end stretch to the inner end stretch; the connecting stretch of each transverse channel meeting the connecting stretch of the laterally-opposite transverse channel to give said transverse groove an axially continuous course also interconnecting the inner end stretches of each transverse channel in a continuity relationship.

Preferably, each transverse channel has a gradually decreasing width away from the corresponding side edge of the tread band and, in another aspect of the invention, it preferably terminates beyond the equatorial plane with a respective inner end stretch the axis of which is oriented at an angle included between 0° and 25°, relative to said equatorial plane.

The outer end stretches of the transverse channels are in turn preferably inclined to an angle included between 0° and 20° on both sides relative to the direction normal to said equatorial plane.

Advantageously, the connecting stretches of the transverse channels having a curved extension with a radius of curvature included between 10% and 40% of the tread width, mutually meet close to the equatorial plane of the tyre and have their mutual-intersection points lying in a common straight line oriented according to an inclination included between 15° and 45° with respect to the equatorial plane.

In addition, it is preferably provided that auxiliary channels should be associated with each of said shoulder block rows, said auxiliary channels each being disposed at a position between and preferentially spaced apart substantially the same distance from the adjacent transverse channels.

Each auxiliary channel advantageously has a first stretch extending from the corresponding side edge of the tread band in a direction substantially normal to the equatorial plane and/or parallel to the outer end stretches of the adjacent transverse channels, and a second stretch crossing an adjacent transverse channel in a direction substantially parallel to the equatorial plane, intersecting said channel close to the transition point between said outer end stretch and connecting stretch.

More preferably, the axis of the second stretch in each auxiliary channel is inclined at an angle included between 0° and 25° relative to the equatorial plane and oriented in an opposite direction to the inner end stretch of the circumferentially adjacent transverse channels.

Each auxiliary channel further has an intermediate stretch connecting the first and second stretches by a curved course.

It is also preferably provided that at least one longitudinal cut should extend from the first stretch of each auxiliary channel, the longitudinal cut partly penetrating into an adjacent shoulder block.

Advantageously, the transverse and auxiliary channels define first shoulder blocks each of which comprises an outer portion of an elongated conformation in a direction substantially perpendicular to the equatorial plane and an inner portion of an elongated conformation in a direction substantially parallel to the equatorial plane, as well as second blocks of same configuration as the outer portions of the first blocks.

As regards centre blocks, each of them has a conformation substantially defined by a centre portion disposed diagonally at the equatorial plane and interconnected, at respectively opposite sides, with two side portions substantially parallel to the equatorial plane.

In accordance with another preferential feature of the present invention, each of said longitudinal grooves consists of a series of stretches, preferably substantially rectilinear, each extending between two contiguous transverse grooves at an angle included between 0° and 10° relative to said equatorial plane, all preferably inclined in the same direction.

In another aspect, the present invention relates to a tyre for motor-vehicle wheels, in particular off-road motor-vehicles, provided with a tread band having the above described features.

In a further aspect, the present invention relates to a tyre having a tread band, in particular for off-road motor-vehicles, comprising at least two circumferentially-extending longitudinal grooves; a plurality of transverse grooves parallel to each other, each comprising at least one first concave stretch and one second convex stretch relative to the circumferential direction of the tyre, to form a transversely continuous groove of undulated extension; said transverse and longitudinal grooves delimiting at least two rows of shoulder blocks circumferentially distributed at opposite side edges of the tread band and at least one row of centre blocks disposed between said rows of shoulder blocks, wherein at least one of said transverse grooves comprises at least one third stretch and one fourth stretch, said third and fourth stretches connected to at least one of said transverse grooves in a continuity relationship and extending in substantially opposite directions, substantially close to the connecting point between said first concave stretch and said second convex stretch.

BRIEF DESCRIPTION OF THE DRAWINGS

Further features and advantages will become more apparent from the detailed description of a preferred but non-exclusive embodiment of a tyre tread band, in particular for off-road motor-vehicles, in accordance with the present invention. This description will be taken hereinafter with reference to the accompanying drawing, given by way of non-limiting example and showing a plan view of a portion of the tread band in accordance with the invention, generally denoted by 1.

DETAILED DESCRIPTION OF THE PREFERRED EMBODIMENTS

Figure 1:
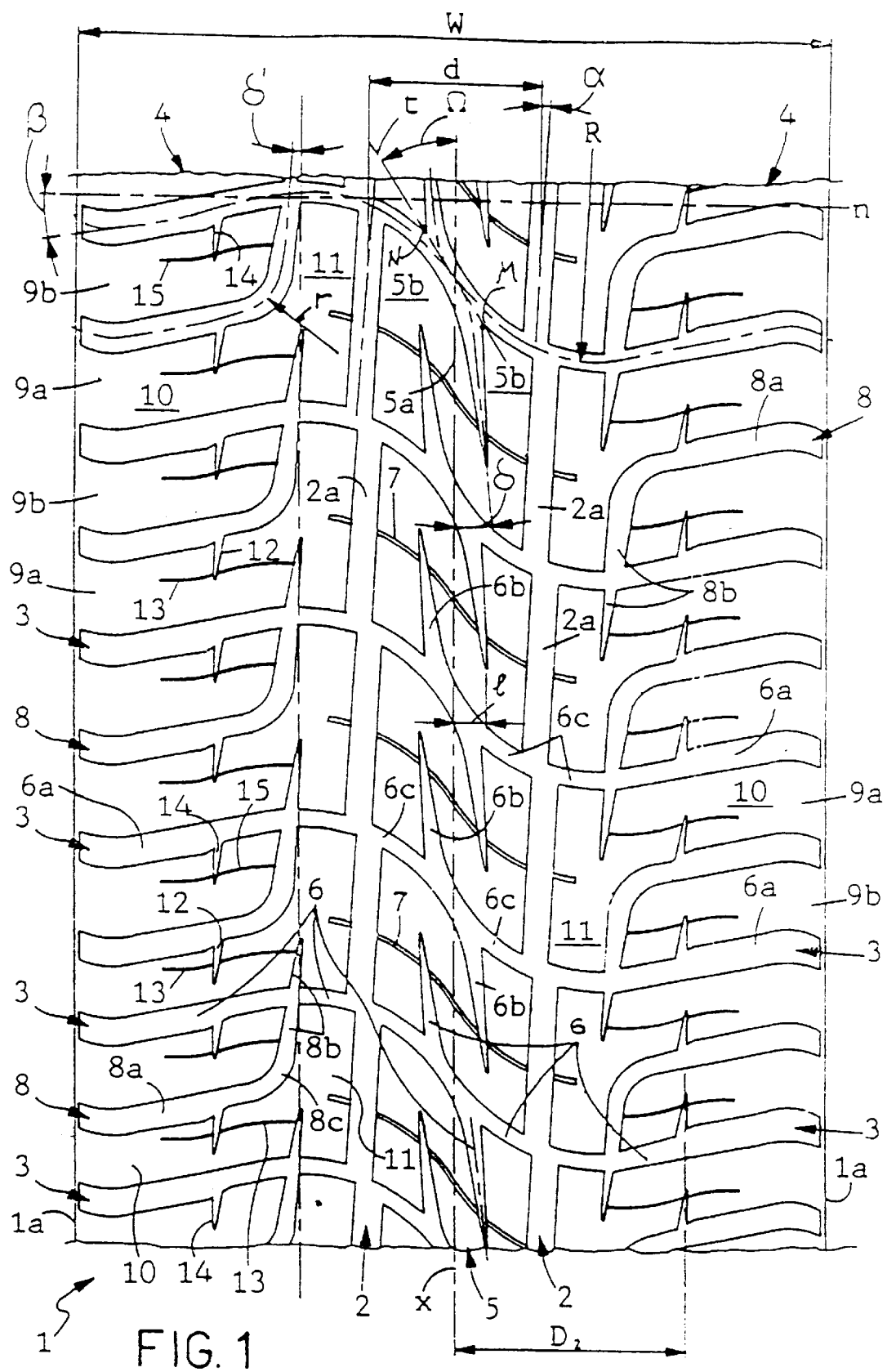

The tread band 1, of the so-called bidirectional type, i.e. free of a preferential rotation direction, and/or symmetric, i.e. without constraints as regards the (inner/outer) mounting side, has at least two longitudinal grooves 2 circumferentially extending on respectively opposite sides relative to the equatorial plane of the tyre to which the tread band 1 will be applied. In the figure said equatorial plane is identified by line "X" parallel to the circumferential extension direction of the tread band. The tread band 1 further has at least one series of transverse grooves 3 each extending between the opposite side edges 1a of the tread band 1 and crossing the longitudinal grooves 2.

In a preferential solution, the longitudinal grooves 2, disposed symmetrically of the equatorial plane "X", are spaced apart from each other by a distance "d" included between 15% and 35% of the overall width "W" of the tread band 1, measured between the side edges 1a.

It is also preferably provided that each longitudinal groove 2 be made up of a series of substantially rectilinear stretches 2a, each extending between two transverse grooves 2 that are contiguous in a circumferential direction, at an angle "α" included between 0° and 10°, and preferably of 3° relative to the equatorial plane "X".

The assembly of transverse grooves 3 and longitudinal grooves 2 defines at least two rows of shoulder blocks 4, circumferentially distributed at the side edges 1a, and at least one row of centre blocks 5, located between the shoulder block 4 rows.

Each of the transverse grooves 3 is advantageously defined by at least two transverse channels 6 that, starting from the opposite side edges 1a, respectively extend in the direction of the central portion of the tread band 1. Each transverse channel 6 has an outer end stretch 6a extending from the respective side edge 1a according to an orientation substantially transverse to the equatorial plane "X". In more detail, each outer end stretch 6a extends at an angle "β" included between 0° and 20°, and preferably of 12°, on either side relative to a direction "n" normal to the equatorial plane.

Each transverse channel 6 preferably terminates beyond the equatorial plane "X", penetrating into the respective centre block 5 by an inner end stretch 6b substantially parallel to the equatorial plane.

In more detail, the axis of each of the inner end stretches 6b is inclined to the equatorial plane "X" by an angle "δ" included between 0° and 25°, and preferably of 7°, and spaced apart from the equatorial plane by a distance "l" included between 3% and 15% of width "W" measured at the apex of said stretch.

As can be easily viewed from the accompanying figure, each transverse channel 6 has a gradually decreasing width starting from the corresponding side wall 1a, where the value of this width is included, just as an indication, between 9 mm and 12 mm, until the apex of the inner end stretch 6b where this width is reduced to a value as low as 2 mm at most.

The outer end stretch 6a and inner end stretch 6b of each transverse channel 6 are mutually connected in a continuity relationship by a connecting stretch 6c having a curvilinear extension of large curvature. In more detail, the connecting stretch 6c extends according to an arc of a circle of radius "R", preferably included between 10% and 40% of W, in particular between 45 and 80 mm.

As clearly shown in the accompanying drawing, the connecting stretch 6c of each transverse channel 6 meets the connecting stretch of the laterally opposite transverse channel 6, so as to give rise to a continuous transverse groove 3 of a substantially undulated extension. Preferably these connecting stretches 6c of the two transverse channels 6 joined together, will form a concave stretch and a convex stretch respectively, relative to the circumferential direction of the tyre.

The connecting stretches 6c also interconnect the end stretches 6b of the respective transverse channels 6 in a continuity relationship.

The intersection points M and N of the axially opposite transverse channels lie in a common straight line "t" oriented according to an inclination "ω" included between 15° and 45° relative to the equatorial plane "X".

Due to the presence of the inner end stretches of the transverse channels 6, each of the centre blocks 5 takes a substantially Z-shaped conformation, seen in side view, defined by a centre portion 5a preferably disposed diagonally, at the equatorial plane "X", and interconnected, at respectively opposite sides, with two side portions 5b preferably extending in a direction substantially parallel to the equatorial plane.

In addition, each centre block 5 is preferably passed through, along a median transverse line, by at least one central narrow cut 7 extending parallelly to the transverse grooves 3. This central narrow cut 7 has a width in the order of 1,5 mm, and at all events included between 0,8 and 2,5 mm and a depth substantially corresponding to half the depth of the transverse grooves and preferably the same depth as the longitudinal grooves 2.

In accordance with a further feature of the present invention, auxiliary channels are associated with each row of shoulder blocks 4. Each of these auxiliary channels 8 is preferably disposed at a position between and spaced apart substantially the same distance from the adjacent transverse channels 6.

Each auxiliary channel 8 preferably of the same depth as the transverse channels 6 or the longitudinal grooves 2, has one stretch 8a extending from the corresponding side edge 1a in a direction preferably parallel to the outer end stretches 6a of the transverse channels 6 and a second stretch 8b crossing an adjacent transverse channel 6 in a direction substantially parallel to the equatorial plane "X", and preferably opposite to that of the inner stretch 6b of said transverse channel 6.

Preferably, the axis of the second stretch 8b of each auxiliary channel 8 is inclined by an angle "δ" included between 0° and 25° relative to the equatorial plane, in a direction opposite to the inclination of the inner end stretches 6b of the transverse channels 6, and crosses the corresponding transverse channel 6 close to the transition point between the outer end stretch 6a and the connecting stretch 6c thereof.

Each auxiliary cut 8 further has an intermediate stretch 8c extending in a curved configuration between the first and second stretches 8a, 8b. Preferably, the intermediate stretch 8c extends in the form of an arc of a circle of a radius "r" included between 10 mm and 35 mm.

In the same manner as described with reference to the transverse channels 6, each auxiliary channel 8 preferably has a gradually decreasing width starting from the corresponding side edge 1a where said width is included between 9 mm and 12 mm, until the apex of the second stretch 8b, where this width takes a value as low as 2 mm at most.

Preferably, the maximum and minimum values of the width of each auxiliary channel 8 are substantially coincident with the maximum and minimum values of the width of the transverse channels 6.

The presence of the auxiliary cuts 8 alternated with the transverse cuts 6 gives rise, in each of the shoulder block 4 rows, to first and second shoulder blocks 9a and 9b placed consecutively one after the other in an alternate sequence. The first shoulder blocks 9a have a substantially L-shaped configuration, an outer portion 10 of which has an elongated conformation substantially perpendicular to the equatorial plane "X" and an inner portion 11 of which has an elongated conformation in a direction substantially parallel to the equatorial plane. The apex of the second stretch 8b of each channel 8 causes a partial separation between the outer and inner portions of each of the first blocks 9a, thereby partly releasing one portion from the other portion.

Further extending from the first stretch 8a of each auxiliary channel 8 is a blind longitudinal cut 12 preferably of a width corresponding to about half the depth of the auxiliary channel and spaced apart from the equatorial plane "X" by a distance $D_2$ included between 25% and 40% of "W". This longitudinal cut penetrates into the outer portion 10 of the adjacent first block 9a by about half its circumferential extension in order to reduce the overall stiffness of the first block 9a.

In order to further increase flexibility of the first blocks 9a at the respective outer portions 10, it is contemplated that each of them be further provided with a first outer narrow cut 13 of a width preferably lower than 1.5 mm and extending in a direction substantially parallel to the outer end stretch 6a of the transverse channel 6 starting from the apex of the second stretch 8b of the auxiliary channel 8, and crossing the longitudinal cut 12 to terminate beyond the latter in the direction of the corresponding side edge 1a.

Each of the second shoulder blocks 9b substantially has the same shape and sizes as the outer portion 10 of the first shoulder block 9a.

Auxiliary longitudinal cuts 14, disposed and shaped in the same manner as the above described longitudinal cuts 12, extend from the outer end stretches 6a of the transverse channels 6 penetrating into the second shoulder blocks 9b. Each auxiliary longitudinal cut 14 is crossed, at the apex thereof, by a second outer narrow cut 15 terminating at the second stretch 8b of the auxiliary channel 8, and having the same shape and orientation as described with reference to the first outer narrow cuts 13.

In a different preferred embodiment the substantially rectilinear stretches 2a provided on each longitudinal groove 2 can be inclined in the opposite direction so as to obtain a directional pattern. Preferably, also the second stretches 8b present in the shoulder block 4 rows are disposed in the same direction, in accordance with the inclination direction of the rectilinear stretches 2a so as to more clearly accomplish a directional pattern. Still more preferentially all stretches 6b too are disposed in the same direction as the second stretches 8b.

In a further different embodiment, the longitudinal and transverse groove stretches can be also combined so as to make a pattern of an asymmetric type.

By way of example only, some dimension features of a prototype tyre, size 275/55R17, embodying a tread band in accordance with the invention, are reproduced hereinafter.

It is to point out that the tyre in question is a radial tyre of the traditional type, commonly known by technicians: it comprises a radial carcass having a reinforcing structure formed of at least one ply of rubberized fabric, the ends of which are each turned up about an anchoring core provided on its radially outer surface with a rubber filling. Preferably the turned-up flaps of the carcass ply radially go up outwardly along at least part of the side of said filling.

It is known that the tyre area comprising the anchoring core and filling forms the tyre bead intended for anchoring the tyre to a corresponding mounting rim.

Disposed on the carcass in known manner is a tread band provided with a raised pattern, intended for bringing the tyre into rolling contact with the ground, said raised pattern being in this case the tread pattern of the invention, as previously described.

This kind of tyre also comprises a belt structure disposed crown-wise to the carcass, interposed between the carcass and tread band and substantially extending between the two tyre sidewalls, that is as wide as the tread band. Said belt structure comprises two radially superposed layers of reinforcing cords, preferably of metal material, parallel to each other in each layer and in crossed relationship with those of the adjacent layer relative to the equatorial plane of the tyre, and a radially outermost layer of reinforcing cords, preferably of textile material, and still more preferably of heat-shrinkable (nylon) material, oriented at 0°, i.e. in a circumferential direction. Variant versions of the above described solution are commonly known and intended for specific uses of the tyre and can be applied to the tyre of the invention as well.

Said prototype has the following features:

Overall width of the tread band: "W"=293.7 mm

Inclination of the outer end stretches $6a$ of the transverse channels 6: "β"=12°

Inclination of the inner end stretches $6b$ of the transverse channels 6: "δ"=7°

Radius of curvature of the connecting stretches $6c$ of the transverse channels: "R"=65 mm Distance of the apex of the inner end stretch $6b$ from the equatorial plane "X": "l"=9.4% of "W"

Average inclination of the second stretch $8b$ of the auxiliary channel 8: "δ"=7°

Radius of curvature of the intermediate stretch $8c$ of the auxiliary channel 8: "r"=18 mm Distance of the first and second longitudinal cuts 12, 14 from the equatorial plane "X": "$D_2$"=30% of "W"

Width of each inclined stretch $2a$ of the longitudinal grooves 2: =10 mm

Inclination of the inclined stretches of the longitudinal grooves 2 "α"=3°

Depth of the longitudinal grooves 2, of the transverse and auxiliary channels 6 and 8, respectively: =8,5 mm The tread band pattern in question has such geometrical features that, while the number and width of the transverse and auxiliary channels 6 and 8 respectively and the longitudinal grooves 2 are conveniently large so as to achieve the required performances on muddy, snow-covered and similar road surfaces, the tyre in any case has an excellent drive behaviour even on an asphalted road.

In particular, the presence of the auxiliary channels 8 in the shoulder block 4 rows causes the pitch of the blocks at the tyre shoulders to be substantially doubled relative to the innermost areas of the tread band. This condition appears to be advantageous to the ends of the so-called "progressiveness" in the tyre ground-contacting, that is the tyre suitability, on reaching the adhesion limits in the cornering, to transmit the driver the feeling that this limit is reached without giving rise to sudden adhesion losses.

The inner portions 11 of the first shoulder blocks $9a$, prolonging in the circumferential direction to an extent equal to the pitch of the transverse channels 6, ensure excellent steering properties and roadholding features in connection with slip thrusts. In addition, interconnection between the outer portions 10 and inner portions 11 of the first shoulder blocks $9a$ ensures an excellent torsional stiffness of the blocks themselves, useful for achieving an even wear.

The presence of the longitudinal grooves 2 consisting of rectilinear stretches $2a$ and second stretches $8b$ of the auxiliary channels 8, preferably substantially parallel to each other, ensures by itself, an efficient water draining when the vehicle is running on wet road surfaces.

In addition, the thus shaped longitudinal grooves promote the steering property.

An efficient water draining from the ground-contacting area of the tyre is further promoted by the particular conformation of the transverse channels 6 at the respective inner end stretches $6b$, as well as by effect of the mutual intersection of the connecting stretches $6c$. In this manner the water gathered in the central region of the ground-contacting area is easily caused to flow through the transverse channels 6 towards the longitudinal grooves 2 and the outer side edges $1a$.

In addition, due to the conformation of the centre blocks 5, a good stiffness of same is achieved, so that movements of said centre blocks, on their contacting the ground, is limited and in any case optimized, which will bring about an advantage in terms of evenness and low velocity of wear, without on the other hand impairing the tyre capability of absorbing the upward projecting bumps on the road, to advantage of the ride comfort.

It is also to point out that blocks in the tread band in question have a gradually decreasing torsional stiffness from the equatorial plane towards the opposite side edges, to advantage of the performance and ride comfort features on an asphalted road surface.

Reproduced in the following tables are the evaluations, indicated by a 1 to 7 score, of the behavioural features of a tyre provided with a tread band in accordance with the present invention (line A) as compared with a tyre of known type (line B).

In more detail, the tyre of known type is the best tyre, based on tests carried out by the Applicant, presently available on the market, sold for the same use as the tyre made in accordance with the invention.

TABLE 1

|   | 1 | 2 | 3 | 4 | 5 | 6 | 7 | 8 |
|---|---|---|---|---|---|---|---|---|
| A | 7 | 6 | 6 | 6.5 | 7 | 7 | 6.5 | 6 |
| B | 6.5 | 6 | 6 | 6 | 6 | 6 | 6 | 5 |

Table 1 refers to a behaviour on a dry road surface. In this table scores under columns 1 and 2 refer to steering property on a straight stretch and steering rigidity, respectively.

Scores under columns 3 and 4 in turn refer to the void in the middle of steering and steering quickness. By "void in the middle", as known to those skilled in the art, is intended the tyre capability of reacting to minimum rotations of the steering wheel relative to the straight neutral position.

Columns 5 and 6 refer to the steering property in the cornering and readiness in realignment, respectively.

Scores under columns 7 and 8 refer to the capability of absorbing shocks when obstacles present on the road surface are stepped over and to the running noise.

The following Table 2 refers instead to a behaviour on a wet road.

TABLE 2

|   | 1   | 2 | 3   | 4   |
|---|-----|---|-----|-----|
| A | 6.5 | 7 | 7   | 7   |
| B | 5   | 6 | 6.5 | 6.5 |

In Table 2, scores in columns 1 and 2 point out balancing between the tyre features and those of the vehicle suspension system, between the front and back axles, under understeering (column 1) and oversteering (column 2) conditions respectively, that is the positive or negative tyre influence on the vehicle behaviour (under the above running conditions).

Items in columns 3 and 4, in turn, concern how the tyre can be controlled in slip, at the adhesion limit, and the tyre behaviour on decreasing of the speed, in slip and at the end of a bend.

From the above tables it is possible to see that the tyre provided with a tread band in accordance with the invention has, on an average, obtained higher scores than the tyre of known type.

Finally, referring again to FIG. 1, it is possible to see that preferably the two connecting stretches 6a of each continuous transverse groove 3 form a stretch of substantially sinusoidal course. This sinusoid is preferably inclined at an angle included between about 10° and about 40° relative to the axis perpendicular to the equatorial plane X of the tyre. More preferably, it is clockwise or anticlockwise rotated by an angle included between about 18° and about 28° and most preferably between about 21° and about 25°. The outer end stretches 6a extend said sinusoid in a transverse direction. The sinusoid angle and width are capable of forming a groove 3 of great transverse extension, together with stretches 6a. Preferably said groove 3 includes two stretches of substantially horizontal extension, limited in the middle by the longitudinal (or substantially longitudinal: to the ends of the present invention the two terms are intended as equivalent) grooves 2 constituting more than the two thirds of the whole groove 3.

Obviously, a person skilled in the art, after understanding the invention as above described, will be able to easily carry out modifications, variations and replacements of the variables associated with the present invention for meeting specifications and applicatory requirements, depending on specific needs.

What is claimed is:

1. A tyre having a tread band, the tread band comprising:
    at least two circumferentially-extending longitudinal grooves; and
    a plurality of transverse grooves parallel to each other, each comprising at least one first concave stretch and one second convex stretch relative to a circumferential direction of the tyre and forming a transversely continuous groove of undulated extension,
    the longitudinal and transverse grooves delimiting at least two rows of shoulder blocks circumferentially distributed at opposite side edges of the tread band, and at least one row of centre blocks disposed between the rows of shoulder blocks, wherein each of the centre blocks has a substantially Z-shaped conformation defined by a centre portion disposed diagonally at an equatorial plane of the tyre and interconnected on respectively opposite sides with two side portions substantially parallel to the equatorial plane of the tyre.

2. The tyre of claim 1, further comprising at least two inner end stretches, the inner end stretches connected to at least one of the transverse grooves in a continuity relationship, wherein the inner end stretches at least partially delimit the substantially Z-shaped conformation of the centre blocks.

3. A tyre having a tread band, the tread band comprising:
    at least two longitudinal grooves substantially parallel to each other and extending circumferentially on opposite sides of an equatorial plane of the tyre, each of the longitudinal grooves consisting of a series of substantially rectilinear stretches;
    at least one series of transverse grooves parallel to each other and crossing the longitudinal grooves, the transverse and longitudinal grooves delimiting at least two rows of shoulder blocks circumferentially distributed at opposite side edges of the tread band, and at least one row of centre blocks disposed between the at least two rows of shoulder blocks, wherein each of the centre blocks comprises a single element defined by two substantially rectilinear stretches of the longitudinal grooves extending between two contiguous transverse grooves and each of the transverse grooves comprising at least two transverse channels, each of which comprises:
    an outer end stretch extending from a respective side edge of the tread band in an orientation substantially perpendicular to the equatorial plane of the tyre;
    a curvilinear connecting stretch that, by joining to a corresponding curvilinear connecting stretch of the laterally-opposite transverse channel, gives the transverse groove a continuous course, wherein at least one transverse channel of at least one of the transverse grooves further comprises:
    an inner end stretch penetrating into a centre block, the connecting stretch interconnecting the outer end stretch with the inner end stretch in a continuity relationship.

4. A tyre having a tread band, the tread band comprising:
    at least two longitudinal grooves substantially parallel to each other and extending circumferentially on opposte ses of an equatorial plane of the tyre;
    at least one series of transverse grooves crossing the longitudinal grooves, the transverse and longitudinal grooves delimiting at least two rows of shoulder blocks circumferentially distributed at opposite side edges of the tread band, and at least one row of centre blocks disposed between the at least two rows of shoulder blocks, each of the transverse grooves comprising at least two transverse channels, each of which comprises:
    an outer end stretch extending from a respective side edge of the tread band to a first position in an orientation substantially perpendicular to the equatorial plane of the tyre;
    a curvilinear connecting stretch extending from the first position to a second position close to the equatorial plane of the tyre that, by joining to a corresponding curvilinear connecting stretch of a laterally-opposite transverse channel at the second position, gives the transverse groove a continuous course, wherein at least one transverse channel of at least one of the transverse grooves further comprises:

an inner end stretch extending from the second position to an apex, the connecting stretch interconnecting the outer end stretch with the inner end stretch in a continuity relationship; and, wherein the inner end stretch penetrates a centre block but does not cross any other of said transverse grooves, such that the centre block is a single element defined by said two longitudinal grooves extending between two contiguous transverse grooves.

5. The tyre of claim 4, wherein each inner end stretch is oriented in a direction substantially parallel to the equatorial plane of the tyre.

6. The tyre of claim 4, wherein each transverse channel terminates beyond the equatorial plane of the tyre by a respective inner end stretch.

7. A tyre having a tread band, the tread band comprising:
at least two longitudinal grooves substantially parallel to each other and extending circumferentially on opposite sides of an equatorial plane of the tyre;
at least one series of transverse grooves crossing the at least two longitudinal grooves, the transverse and longitudinal grooves delimiting at least two rows of shoulder blocks circumferentially distributed at opposite side edges of the tread band, and at least one row of centre blocks disposed between the at least two rows of shoulder blocks, each of the transverse grooves comprising at least two transverse channels, each of which comprises:
an outer end stretch extending from a respective side edge of the tread band to a first position inclined at an angle between 0° and 20° on both sides relative to a direction normal to the equatorial plane of the tyre;
a curvilinear connecting stretch extending from the first position to a second position close to the equatorial plane of the tyre that, by joining to a corresponding curvilinear connecting stretch of a laterally-opposite transverse channel at the second position, gives the transverse groove a continuous course, wherein at least one transverse channel of at least one of the transverse grooves further comprises:
an inner end stretch extending from the second position to an apex, the connecting stretch interconnecting the outer end stretch with the inner end stretch in a continuity relationship; and,
wherein the inner end stretch penetrates a centre block but does not cross any other of said transverse grooves, such that the centre block is a single element defined by said two longitudinal grooves extending between two contiguous transverse grooves.

8. The tyre of claim 4, wherein an axis of the inner end stretches is oriented at an angle between 0° and 25° relative to the equatorial plane of the tyre.

9. The tyre of claim 4, wherein the connecting stretch extends according to a radius of curvature between 45 mm and 80 mm.

10. The tyre of claim 4, wherein each of the transverse channels has a gradually decreasing width away from a corresponding side edge of the tread band.

11. The tyre of claim 4, wherein intersecting points of the transverse channels lie in a common straight line inclined at an angle between 15° and 45° relative to the equatorial plane of the tyre.

12. The tyre of claim 4, wherein at least one auxiliary channel is associated with at least one shoulder block row, each auxiliary channel being disposed at a position between and spaced apart a substantially same distance from two adjacent transverse channels.

13. The tyre of claim 12, wherein each auxiliary channel has a first stretch extending from a corresponding side edge of the tread band in a direction substantially parallel to the outer end stretches of the transverse channels, and a second stretch crossing an adjacent transverse channel in a direction substantially parallel to the equatorial plane of the tyre.

14. The tyre of claim 13, wherein the second stretch of each auxiliary channel intersects the transverse channel close to a transition point between the outer end stretch and the connecting stretch.

15. The tyre of claim 13, wherein each auxiliary channel further has an intermediate stretch connecting the first and second stretches following a curved course.

16. The tyre of claim 13, wherein an axis of the second stretch of each auxiliary channel is inclined at an angle between 0° and 25° relative to the equatorial plane of the tyre and oriented in a direction opposite to the inner end stretch of a contiguous transverse channel.

17. The tyre of claim 13, wherein extending from the first stretch of each auxiliary channel is at least one longitudinal cut partly penetrating into an adjacent shoulder block.

18. The tyre of claim 13, wherein the transverse and auxiliary channels define first shoulder blocks comprising an outer portion having an elongated conformation in a direction substantially perpendicular to the equatorial plane of the tyre and an inner portion having an elongated conformation in a direction substantially parallel to the equatorial plane of the tyre, as well as second shoulder blocks.

19. The tyre of claim 13, wherein each of the longitudinal grooves comprises a series of rectilinear stretches each extending between two contiguous transverse grooves at an angle between 0° and 10° relative to the equatorial plane of the tyre.

20. The tyre of claim 12, wherein the longitudinal grooves, the transverse grooves, and the auxiliary channels are disposed according to a bidirectional pattern.

21. The tyre of claim 12, wherein the longitudinal grooves, the transverse grooves, and the auxiliary channels are disposed according to a symmetric pattern.

22. The tyre of claim 12, wherein the longitudinal grooves, the transverse grooves, and the auxiliary channels are disposed according to a directional pattern.

23. A tyre having a tread band, the tread band comprising:
at least two circumferentially-extending longitudinal grooves;
a plurality of transverse grooves parallel to each other, each comprising at least one first concave stretch and one second convex stretch relative to a circumferential direction of the tyre and forming a transversely continuous groove of undulated extension, wherein the at least one first concave stretch is connected to the second convex stretch at a connecting point close to an equatorial plane of the tyre;
the transverse and longitudinal grooves delimiting at least two rows of shoulder blocks circumferentially distributed at opposite side edges of the tread band and at least one row of centre blocks disposed between the rows of shoulder blocks, wherein at least one of the transverse grooves comprises:
at least one third stretch and one fourth stretch, the third and fourth stretches connected to the transverse groove in a continuity relationship and extending in substantially opposite directions along the circumferential direction of the tyre substantially close to the connecting point;

wherein the third stretch penetrates a centre block but does not cross any other of said transverse grooves, such that the centre block is a single element defined by said two longitudinal grooves extending between two contiguous transverse grooves; and, wherein the fourth stretch penetrates a centre block but does not cross any other of said transverse grooves, such that the centre block is a single element defined by said two longitudinal grooves extending between two contiguous transverse grooves.

24. The tyre of claim 23, wherein at least one auxiliary channel is associated with at least one shoulder block row, each auxiliary channel being disposed at an intermediate position relative to two adjacent transverse grooves.

25. The tyre of claim 24, wherein each auxiliary channel associated with a same row of shoulder blocks comprises a fifth stretch, the fifth stretches all extending substantially in a same direction relative to the circumferential direction of the tyre.

26. The tyre of claim 25, wherein the fifth stretches of the auxiliary channels associated with two different rows of shoulder blocks all extend substantially in a same direction relative to the circumferential direction of the tyre.

27. A tyre having a tread band, the tread band comprising:

at least two circumferentially-extending longitudinal grooves;

a plurality of transverse grooves parallel to each other, each comprising at least one first stretch and one second stretch relative to a circumferential direction of the tyre and forming a transversely continuous groove of substantially sinusoidal course defining at least one inflection point, wherein the at least one first stretch is connected to the second stretch at an inflection point close to an equatorial plane of the tyre;

the transverse and longitudinal grooves delimiting at least two rows of shoulder blocks distributed circumferentially at opposite side edges of the tread band and at least one row of centre blocks disposed between the at least two rows of shoulder blocks, wherein at least one of the transverse grooves comprises:

at least one third stretch and one fourth stretch, the third and fourth stretches connected to the transverse groove in a continuity relationship and extending in substantially opposite directions along the circumferential direction of the tyre substantially close to the inflection point;

wherein the third stretch penetrates a centre block but does not cross any other of said transverse grooves, such that the centre block is a single element defined by said two longitudinal grooves extending between two contiguous transverse grooves; and, wherein the fourth stretch penetrates a centre block but does not cross any other of said transverse grooves, such that the centre block is a single element defined by said two longitudinal grooves extending between two contiguous transverse grooves.

\* \* \* \* \*

UNITED STATES PATENT AND TRADEMARK OFFICE
CERTIFICATE OF CORRECTION

PATENT NO.   : 6,508,283 B1  
DATED        : January 21, 2003  
INVENTOR(S)  : Nicotina It is certified that error appears in the above-identified patent and that said Letters Patent is hereby corrected as shown below:

Title page,  
Item [54], Title, "TRYE" should read -- TYRE --.

Column 10,  
Line 46, "opposte" should read -- opposite --.  
Line 47, "ses" should read -- sides --.

Column 12,  
Line 38, "bidirectional" should read -- bi-directional --.

Signed and Sealed this

Twenty-ninth Day of April, 2003

JAMES E. ROGAN  
*Director of the United States Patent and Trademark Office*